S. F. PIERCE.
COOKING DEVICE.
APPLICATION FILED NOV. 22, 1909.

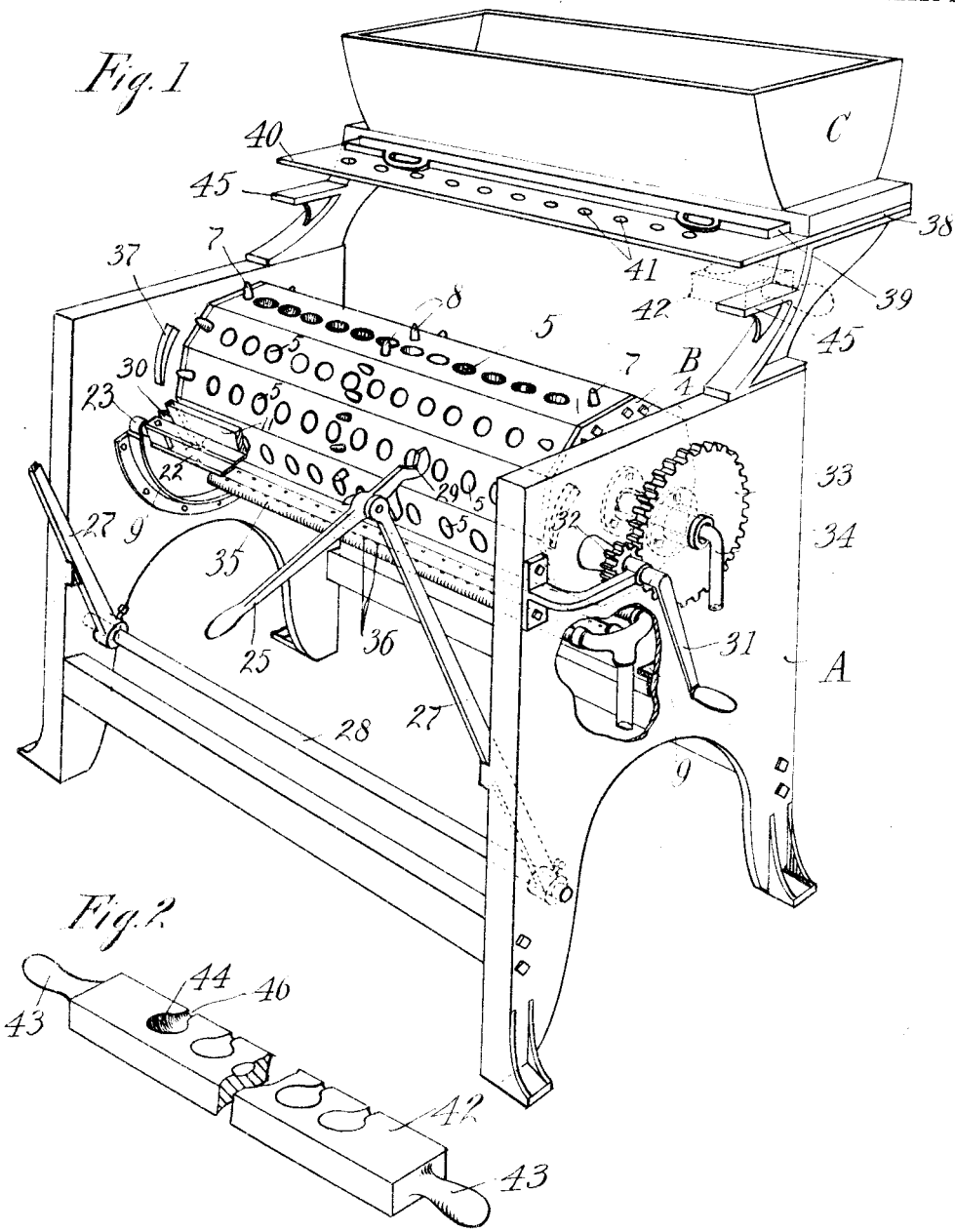

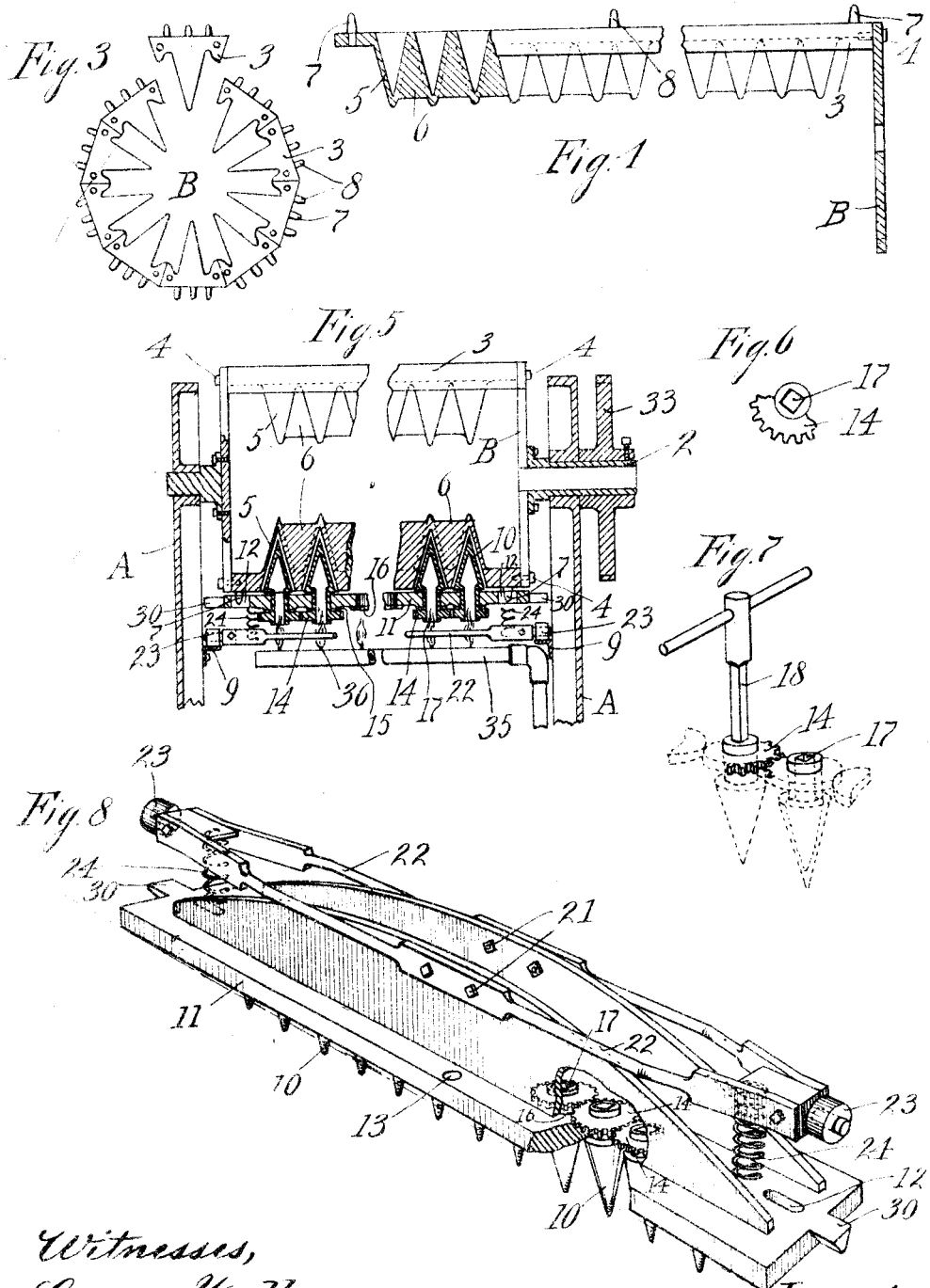

1,136,261.

Patented Apr. 20, 1915.
3 SHEETS—SHEET 3.

Witnesses,
George Voelker
W. Smith

Inventor,
Simeon F. Pierce
by Lothrop & Johnson
his Attorneys.

UNITED STATES PATENT OFFICE.

SIMEON F. PIERCE, OF ST. PAUL, MINNESOTA, ASSIGNOR, BY DIRECT AND MESNE ASSIGNMENTS, TO CREAM CONE MACHINE COMPANY, OF ST. PAUL, MINNESOTA, A CORPORATION OF MINNESOTA.

COOKING DEVICE.

1,136,261.　　　　Specification of Letters Patent.　　Patented Apr. 20, 1915.

Application filed November 22, 1909. Serial No. 529,161.

*To all whom it may concern:*

Be it known that I, SIMEON F. PIERCE, a citizen of the United States, residing at St. Paul, in the county of Ramsey and State of Minnesota, have invented certain new and useful Improvements in Cooking Devices, of which the following is a specification.

My invention relates to improvements in cooking devices designed particularly for cooking pastry cornets and consists in an improved construction of machine whereby cornets may be as conveniently and more expeditiously baked than in the ordinary hand devices, and to that end consists in the features of construction and combination hereinafter more particularly described and claimed.

Figure 9:
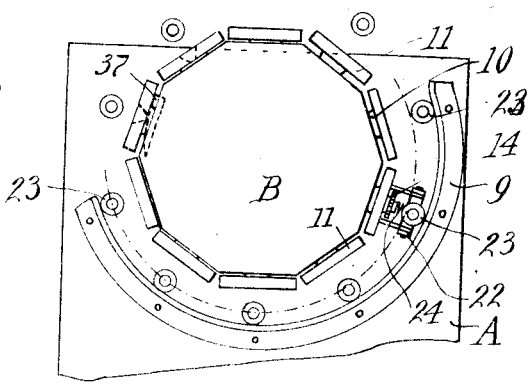
Figure 11:
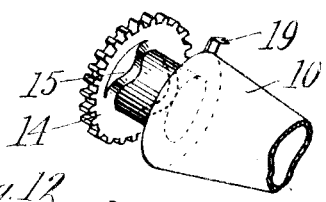
Figure 10:
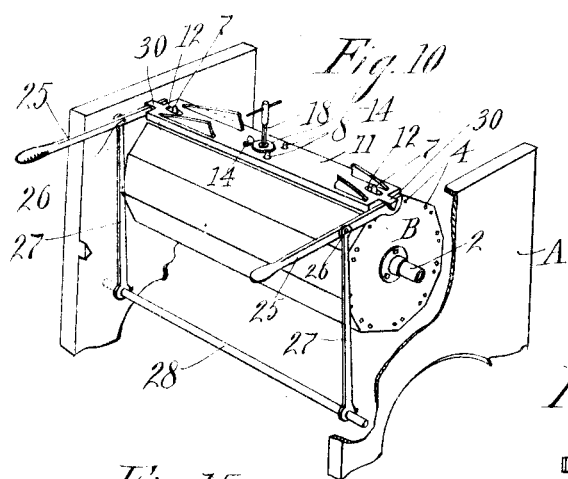
Figure 12:
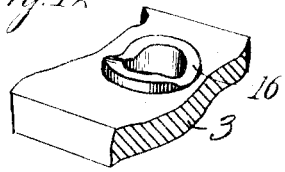
Figure 14:
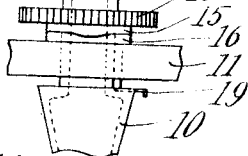
Figure 13:
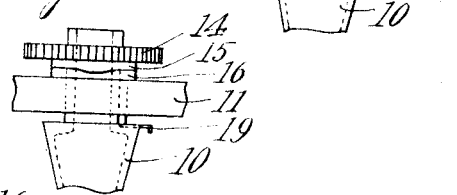
Figures 15, 16:
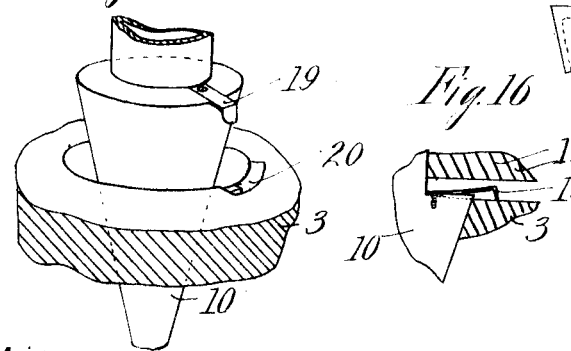

In the accompanying drawings forming part of this specification Figure 1 is a perspective view of my improved machine partly broken away; Fig. 2 is a similar view of the dough feeding device forming part of my invention; Fig. 3 is an end view of the oven showing one section thereof partly removed; Fig. 4 is a side elevation of one of the oven sections or segments shown partly in section; Fig. 5 is a vertical section through the oven and adjacent framework, partly broken away; Fig. 6 is a detail view of the top of one of the inner molds partly broken away; Fig. 7 is a perspective view illustrating the means for separating the mold members; Fig. 8 is a perspective view of a supporting bar or frame for the inner mold members partly broken away; Fig. 9 is a conventional end view of the oven and molds taken inside the outer wall; Fig. 10 is a conventional perspective view of my invention shown partly broken away and illustrating the inner mold carrying bar about to be lifted from the oven; Fig. 11 is a perspective view of one of the inner molds broken away; Fig. 12 is a perspective view of a portion of a plate for supporting the inner molds; Figs. 13 and 14 are side elevations of one of the inner molds and supporting plate shown broken away, the mold being shown turned in different positions with respect to said plate in the respective views; Fig. 15 is a view of the two mold members each shown broken away; and Fig. 16 is a side elevation of a portion of the inner and outer mold members illustrating a coöperating trimming knife.

Referring to the drawings A represents the framework of the machine, and B an oven supported in the ends of said framework upon a shaft 2, said shaft being preferably hollow at one end. The oven B is made up of a plurality of segments 3 fitted together as shown in Fig. 3 and secured between the end walls of the oven as by means of bolts 4. Each oven segment carries a plurality of outer mold members 5. The inner ends of the outer molds 5, within the oven, are preferably separated by the solid wall portion 6 forming heat conducting surfaces. Each oven segment is formed with exterior outward projecting end studs 7 and central studs 8 for the purpose hereinafter set forth. Carried by the end walls of the framework and partially surrounding the oven are the tracks 9, said tracks being each spaced farther from the oven at their rear than at their front ends. The rear ends of the tracks constitute the entrance ends in the rotation of the oven. The coöperating inner mold members 10 are supported by a plate 11 formed with slotted end openings 12 and central round openings 13 to receive respectively the end pins 7 and center pins 8 when said bar is placed upon one of the oven segments with the inner mold members extending into the outer mold members. The inner mold members 10 are rotatable and vertically slidable in the plate 11. Each inner mold member carries at its upper end a gear wheel 14, the gear wheels of the different molds intermeshing. Upon the underside of each gear wheel is formed a cam 15 coöperating with a cam 16 on the upper surface of the plate 11. The inner mold members are hollowed and formed with rectangular openings 17 in their upper ends into which may be fitted a suitable wrench 18 by which the molds may be turned to loosen them in the cornets in the process of cooking. In the rotation of the molds the coöperating cams 15 and 16 will raise the inner molds, as indicated particularly in Figs. 13 and 14. Carried by the upper end of each inner mold is an outwardly and downwardly extending trimming blade 19 which in the process of baking extends into the inclined slot 20 in the edge of the coöperating outer mold. The rotating of the inner mold will carry the trimming blade 19 out of the slot 20 and around the upper face of the outer mold, as indicated in Fig. 16, to trim the cornet.

Each plate 11 has central support 21 upon a longitudinally extending spring bar 22, said bar carrying rollers 23 at its ends to travel within the tracks 9 in the operation of the machine. Supplementary coil springs 24 are interposed between the ends of the spring bar and plate 11.

For the purpose of lifting the inner molds onto and off from the oven I provide the hand levers 25 having fulcrum support 26 upon links 27, said links in turn having pivotal support upon the rod 28. The hand levers are formed at their inner ends with notches 29 to receive the angular bearings 30 upon the ends of the plate 11. The oven is revolved by a suitable handle 31, journaled upon one end of the machine and formed with a gear pinion 32 intermeshing with a gear wheel 33 carried by the adjacent end of the oven supporting shaft 2. The oven may be interiorly heated through the medium of a suitable gas conducting pipe 34 extending through the hollow end of the oven shaft into the interior of the oven and carrying upon its inner end a suitable burner not shown. The inner mold members are heated as by means of the gas burners 35 supported underneath the oven and having burners 36 in position to direct the flame jets into the open ends of the inner members at predetermined points in their travel around the tracks 9 as indicated in Fig. 5. For the purpose of slightly separating the mold members as the outer molds leave the delivery end of the tracks I provide, above the delivery ends of the tracks, guides 37 which will engage with the bearings 30 and slightly carry the inner molds away from the outer molds.

For the purpose of handling the dough I provide a suitable dough receptacle C having slidable upon its bottom 38 a plate 39 formed with a plurality of openings not shown. The bottom 38 of the dough receptacle extends forwardly to form a shelf 40 which is formed with a plurality of openings 41 corresponding in size to the openings in the slide 39. The openings in the slide 39 constitute pockets to be filled with dough, and when the slide is drawn forward to cause its openings to register with the openings 41, the dough in said pockets will drop through said openings 41. To receive the dough as it drops through the openings 41 I provide a bar 42 provided with end handles 43 and formed with a plurality of pockets 44 to receive the dough as it drops through the openings 41. Underneath the shelf 40 I provide suitable supporting brackets 45 for the bar 42. In use the bar 42 will be placed upon supports 45 and the slide 39 manipulated to fill the pockets 44. The bar may then be removed from the supports and the dough in the pockets 44 poured from said pockets through their mouths 46 into the outer molds 5 in the upper oven segment.

Among the important features of my invention is the spring supporting bar 22 for the inner mold members by means of which the mold members are resiliently held in coöperation with the outer mold members, allowing the inner mold members to be forced outward by the gases generated in cooking the cornets, to allow the escape of such gases. Further by means of the guideways 9 which are spaced farther from the oven at the rear than at the front ends the mold members are gradually brought closer together in the rotation of the oven. Another important feature of my invention is the central pins 8, the outer ends of the plate 11 being free and longitudinally guided by the pins 7 extending into the slotted openings 12. The center of the plate 11 is thus held rigid allowing longitudinal expansion toward each end and avoiding the binding which takes place were the bar rigidly supported or unanchored. By means of the driving connection 14 between the inner mold and by the cams 15 and 16 the inner mold members are simultaneously rotated as well as raised to free the cornets and also bring the knife 19 into position for trimming. The inner mold members being of the character shown and being liftable onto and away from the oven by the hand levers give the advantages inherent in the ordinary hand molds and a far greater capacity and the particular character of coöperating dough device shown assists in the effective use of the machine.

As shown in Fig. 8 the plate 11 is preferably curved upwardly in the center so as to cause its ends to fit snugly against the oven. In operation the center of the plate will be sprung against the oven, by the bars 22, and the ends of the plate will be held from springing upwardly by means of the supplementary springs 24.

I claim as my invention:

1. A machine of the class described comprising in combination a rotary oven, a plurality of rows of outer mold members peripherally supported by said oven, a plurality of freely removable inner mold members, common supporting means for said inner mold members, an eccentric bearing surface for said mold supporting means partly surrounding said oven, and spring means engaged by said bearing surface to hold said inner mold members resiliently pressed in coöperation with said outer mold members in the rotation of said oven.

2. A machine of the class described comprising in combination a rotary oven, a plurality of rows of outer mold members peripherally supported by said oven, a plurality of rows of inner mold members, a common support for each row of inner mold members, said support and inner mold members being freely removable from said oven, a spring member arranged upon the outer side of said inner mold member support, and means engaging with said spring member during a part of the rotation of said oven to hold said inner members resiliently in coöperation with said outer members.

3. A machine of the class described comprising in combination a rotary oven, a plurality of rows of outer mold members peripherally supported by said oven, a plurality of rows of coöperating inner mold members, a supporting plate therefor, each row having rotatable and vertically adjustable support in said plate and means for holding said molds together in the rotation of said oven comprising a support having spring connection with said plate and guideways for said support partially surrounding said oven.

4. A machine of the class described, comprising in combination a rotary oven, a row of outer mold members extending longitudinally of the periphery of said oven, a row of coöperating inner mold members, a plate supporting said inner mold members, coöperating cams between said inner mold members and plate, a driving connection between said inner mold members allowing them to be simultaneously rotated and to be raised by said cams, a spring bar having central connection with said plate and guideways for said bar partly surrounding said oven.

5. A machine of the class described comprising a rotary oven, a row of outer mold members peripherally supported by said oven, a row of coöperating inner mold members, a plate supporting the same, means for resiliently holding said molds in coöperation in the rotation of said oven and means for centrally anchoring said plate upon said oven and leaving its ends anchored whereby to compel expansion of the plate from the center outwardly.

6. A machine of the class described comprising in combination a rotary oven, outer mold members peripherally supported by said oven, coöperating inner mold members removably supported in connection therewith, and a trimming knife extending outwardly and downwardly from the upper end of said outer mold members in coöperation with a groove in the outer face of the outer mold member.

7. Pastry cone cooking means comprising a row of outer mold members, a row of coöperating inner mold members, common supporting means for said inner mold members, a spring bar extending longitudinally of said inner mold members and connected therewith, means for applying pressure at the ends of said bar, and means for applying heat to said members.

8. Pastry cone cooking means comprising a row of outer mold members, a row of coöperating inner mold members carried by a plate, a spring bar extending longitudinally of said plate and connected therewith, means for applying pressure at the ends of said bar to hold said mold members in coöperation, and means for applying heat to said members.

9. In a machine of the character specified, a frame for supporting the operating parts, a shaft mounted in the frame, a mold frame mounted on the shaft with a series of molds radially disposed thereon, each set of molds provided with a separable core plate, each core plate carrying a longitudinally disposed roller, with the frame provided with an eccentric bearing surface for the core plate rollers, whereby the core plates will be pressed into the molds by engagement of the rollers with the eccentric bearing surface during the rotation of the molds.

In testimony whereof I affix my signature in presence of two witnesses.

SIMEON F. PIERCE.

Witnesses:
H. S. JOHNSON,
H. SMITH.